(12) United States Patent
Glaser (10) Patent No.: US 7,487,022 B2
(45) Date of Patent: Feb. 3, 2009

(54) METHOD AND DEVICES FOR TRANSMITTING DATA BETWEEN A CENTRAL CONTROL DEVICE OF A PASSENGER PROTECTION SYSTEM IN A VEHICLE AND AT LEAST ONE DECENTRALIZED SENSOR UNIT

(75) Inventor: Telmo Glaser, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 488 days.

(21) Appl. No.: 10/556,541

(22) PCT Filed: Apr. 19, 2004

(86) PCT No.: PCT/EP2004/050561

§ 371 (c)(1),
(2), (4) Date: Nov. 14, 2005

(87) PCT Pub. No.: WO2004/101326

PCT Pub. Date: Nov. 25, 2004

(65) Prior Publication Data

US 2007/0032933 A1 Feb. 8, 2007

(30) Foreign Application Priority Data

May 14, 2003 (DE) .................................. 103 21 679

(51) Int. Cl.
*G06F 7/00* (2006.01)

(52) U.S. Cl. .......................................................... 701/45

(58) Field of Classification Search ............. 701/45–47; 280/728.1, 734–735; 180/268
See application file for complete search history.

(56) References Cited

U.S. PATENT DOCUMENTS

| | | | |
|---|---|---|---|
| 4,538,252 A * | 8/1985 | Aviram | 369/13.01 |
| 4,751,633 A | 6/1988 | Henn et al. | |
| 5,001,642 A * | 3/1991 | Botzenhardt et al. | 701/115 |
| 5,303,348 A * | 4/1994 | Botzenhardt et al. | 710/114 |
| 5,357,141 A | 10/1994 | Nitschke et al. | |
| 5,640,511 A * | 6/1997 | Botzenhardt et al. | 714/57 |
| 5,969,631 A * | 10/1999 | Ammler et al. | 340/825.21 |
| 6,185,252 B1 | 2/2001 | Bauer | |

(Continued)

FOREIGN PATENT DOCUMENTS

| | | |
|---|---|---|
| DE | 34 10 082 A1 | 9/1985 |
| DE | 38 11 217 A1 | 10/1989 |
| DE | G 90 12 215.1 | 10/1990 |

(Continued)

*Primary Examiner*—Yonel Beaulieu
(74) *Attorney, Agent, or Firm*—Laurence A. Greenberg; Werner H. Stemer; Ralph E. Locher (57) ABSTRACT

A method and corresponding devices for transmitting data between a central control device of a passenger protection system in a vehicle and at least one local sensor unit. The sensor unit includes a sensor and is operated in a normal operation mode or in a test operation mode. In the normal operation mode, the data transmitted contain sensor measuring data while in the test operation mode, they contain characteristic data. The sensor unit transmits its data packets in both modes of operation after a synchronization pulse that was last detected and adds to the data packets a different characteristic depending on the operation mode by adding at least one data bit so that the data packets of the normal operation mode and of the test operation mode can be uniquely identified using the respective characteristic.

21 Claims, 7 Drawing Sheets

U.S. PATENT DOCUMENTS

| | | |
|---|---|---|
| 6,208,924 B1 | 3/2001 | Bauer |
| 6,229,437 B1 | 5/2001 | Schmid et al. |
| 6,345,220 B1 | 2/2002 | Ikegami |
| 6,513,831 B2 | 2/2003 | Stierle et al. |
| 6,530,597 B1 | 3/2003 | Nesper et al. |
| 6,587,532 B1 | 7/2003 | Hermann |
| 6,836,714 B1 | 12/2004 | Nitschke et al. |
| 2004/0094349 A1 | 5/2004 | Schumacher et al. |
| 2005/0068195 A1 | 3/2005 | Ohl et al. |

FOREIGN PATENT DOCUMENTS

| | | |
|---|---|---|
| DE | 196 09 290 A1 | 4/1997 |
| DE | 196 16 293 A1 | 10/1997 |
| DE | 196 43 502 A1 | 4/1998 |
| DE | 197 02 270 A1 | 9/1998 |
| DE | 197 42 170 C2 | 3/1999 |
| DE | 198 13 123 A1 | 10/1999 |
| DE | 199 45 614 C1 | 12/2000 |
| DE | 199 46 776 A1 | 4/2001 |
| DE | 100 04 281 A1 | 8/2001 |
| DE | 101 49 332 A1 | 4/2003 |
| EP | 0 841 222 A1 | 5/1998 |
| EP | 0 945 315 A2 | 9/1999 |
| WO | 97/15474 | 5/1997 |
| WO | 97/32758 | 9/1997 |
| WO | 99/12779 | 3/1999 |
| WO | 01/81124 A1 | 11/2001 |
| WO | 02/42123 A1 | 5/2002 |

* cited by examiner

METHOD AND DEVICES FOR TRANSMITTING DATA BETWEEN A CENTRAL CONTROL DEVICE OF A PASSENGER PROTECTION SYSTEM IN A VEHICLE AND AT LEAST ONE DECENTRALIZED SENSOR UNIT

BACKGROUND OF THE INVENTION

1. Field of the Invention

The present invention relates to a method and to devices which are suitable for executing said method for transmitting data between a central control device of a passenger protection system in a vehicle and at least one decentralized sensor unit. In this case, the decentralized sensor unit has a sensor which records sensor measurement data. The sensor unit can be operated in a normal operating mode or in a test operating mode, wherein sensor measurement data is transferred in a normal operating mode whereas characteristic data of the sensor unit is transferred in a test operating mode. In both operating modes, the data which is transferred by the sensor unit is transferred in the form of binary encoded data packets. The transfer by the sensor unit of the data packets which are awaiting transmission follows a most recently detected synchronization pulse of the control device which periodically outputs such synchronization pulses as a request for data packets.

Such a method and suitable devices for it are disclosed in the unexamined German application DE 196 09 290 A1, for example. Said application describes a sensor module (11) which is connected to a control device (5) via a data line (1a). The sensor module (11) includes an acceleration-sensitive sensor and transfers a binary data packet, which is obtained from the sensor measured values of the sensor, periodically every 500 µs to the control device (5) with the aid of modulated current pulses as soon as it has detected a synchronization voltage pulse on the line (1a) (e.g. column 1, line 66 to column 2, line 30 or column 4, lines 55 to 62 in said document). In a second and significantly slower communication mode, it is possible to transfer test data and characteristic data of the decentralized sensor module (11) to the control device (5), e.g. initial test data of the sensor module (11) for checking that it is capable of functioning correctly, identification data of the sensor module (11) etc. (column 4, line 67 to column 5, line 13 in said document). The release readiness of a passenger protection means e.g. a side airbag which is connected to the control device (5) in this case is not yet established at this time point, since the sensor module (11) is still in a startup phase after a switching on of the supply voltage (column 5, lines 3 to 5 in said document).

It is extremely important for each passenger protection system in a vehicle that a control device forming part of said system can distinguish whether the decentralized sensor unit which is connected to it via e.g. a data line is currently operated in a test mode, e.g. initially after a switching on of its supply voltage, and is therefore transferring only characteristic data such as e.g. identification data or test data of the sensor unit or electronics, or whether the sensor unit is already in its normal operating mode wherein sensor measured values are transferred which are possibly evaluated in an algorithm and possibly give cause for triggering a passenger protection means in the event of a detected collision accident of the vehicle.

SUMMARY OF THE INVENTION

The present invention addresses the problem of configuring as reliably as possible a transmission of data between a central control device and at least one decentralized sensor unit, such that only signals intended for this purpose are subjected to an evaluation by the central control device and can then contribute to a triggering of a passenger protection means which is connected to the central control device.

This problem is solved by a method having the method steps in accordance with claim 1.

Furthermore, the object is achieved by a sensor unit in accordance with claim 18, a control device in accordance with claim 19 and a common arrangement of both in accordance with claim 20.

The claimed method is used for the transmission of data between a central control device of a passenger protection system in a vehicle and at least one decentralized sensor unit. The decentralized sensor unit has a sensor which records sensor measurement data. The sensor unit can be operated in a normal operating mode or in a test operating mode, wherein sensor measurement data is transferred in the normal operating mode whereas characteristic data of the first sensor unit is transferred in the test operating mode. In both operating modes, data is transferred from the sensor unit in the form of binary encoded data packets which contain individual data bits. Furthermore, the transfer by the sensor unit of its data packets which are awaiting transmission takes place following a most recently detected synchronization pulse which the control device outputs in order to request data packets from at least one sensor unit.

In accordance with the invention, the sensor unit appends an identifier to the binary data bits which are awaiting transmission by adding at least one identifier bit before the transmission to the central control device. In this case, the data packets which are transmitted in the normal mode have a different identifier in each case than the data packets which are transmitted in the test operating mode. In this manner, the data packets of the normal operating mode can always be reliably distinguished from the data packets of the test operating mode. In this way, it is not possible for the data packets from the two different operating modes to become confused in the central control device which receives the relevant data packets. As a result, it is therefore at least impossible wrongly to trigger a passenger protection means e.g. a side airbag, a head airbag, a belt tightener, a front airbag or similar in a vehicle.

The risk of injury for vehicle passengers is significantly reduced in this way.

In a first advantageous configuration of the claimed method, the identifier of a data packet is an even or odd parity of the individual data bits of the data packet. In order to achieve this, the sensor unit adds a so-called parity bit to those data bits which must be transferred to the central control device via a data line in order to transfer either sensor measured values or characteristic data, and therefore the data packet which is to be transmitted consists of the data bits to be transmitted and the parity bit. If the data packet must be assigned a so-called even parity and if the data packet without the parity bit has an uneven number of logical one states, the sensor unit selects a parity bit which also expresses a logical one for the data packet. Otherwise, if the data packet must be assigned a so-called odd parity, the sensor unit supplements the data bits awaiting transmission with a parity bit having the content of a logical zero. It is crucial to this advantageous configuration of the claimed method that the transmitted data packets have a different parity in the test operating mode than in the normal operating mode. This configuration of a method according to the invention is therefore particularly advantageous since in the simplest form a single parity bit must be added to the existing data bits of a data packet to be transmitted, and the use of parity bits in data transmission has already been customary for a long time and is therefore sufficiently tested.

For an advantageous embodiment of a method according to the invention, it is unimportant in this case whether the data packets of the normal mode have an even parity and those of the test mode have an odd parity or vice versa in each case correspondingly. By permanently assigning the parity to an operating mode, the association of sensor data with a specific operating mode in both cases is always equally certain, and this can be critically important e.g. in the case of an analysis of sensor data by a diagnostic device which is attached to the central control device.

However, a further advantageous embodiment for the identifying of a data packet of a sensor unit can also be a characterizing checksum of the data bits of a data packet. In this case, a plurality of checksum bits are preferably added to the relevant data packet, wherein the characterizing checksum in the normal operating mode always has a different value than in the test operating mode. For example, the binary checksum is formed from all the data bits awaiting transmission and is transmitted together with these data bits inside a data packet. In order to ensure that this checksum in the test operating mode always differs from the checksum in the normal operating mode, the binary checksum is increased to the next higher even binary value in the test operating mode, whereas it is increased to the next higher odd binary value in the normal operating mode. Therefore the data bits 1111111 awaiting transmission in a data packet from a sensor unit would be supplemented by a checksum 1000 in the test operating mode and by a checksum 1001 in the normal operating mode.

However, it is not the exact way of forming a characteristic checksum that is critical for an advantageous embodiment of a method according to the invention, rather that the checksum in the normal operating mode always has a different value than in the test operating mode.

The above described parity bits or checksum bits are generally transmitted with a data packet for reasons of transmission security. In order to ensure such a transmission security using parity bits or checksums which could also change over the course of time in accordance with the invention, it is necessary for the receiving side to know the parity or checksum which is expected for a received data packet at any moment, in order then to identify an error in the data transmission in the case of a non-compliant parity or checksum. Above all in that field of use of the present invention which relates to personal safety, this is a particularly preferred use of the method according to the invention.

The invention is therefore preferably used e.g. in a method in which, after a switching on of a supply voltage by the central control device, the decentralized sensor unit is initially in an initialization mode during a known initialization time, in which initialization mode the electronics are made ready for operation, then in the test operating mode during a test time which is also known, and finally in the normal operating mode. Since the start time point and the end of the test operating mode are precisely known to the central control device, the central control device also knows the identifier that is expected for a received data packet at any time, and can identify a possible error in the data transmission on the basis of an incorrect identifier of a data packet.

The test time preferably lasts until the start of a new synchronization pulse, after all the desired data packets have been transmitted in the test operating mode, irrespective of the time which has actually elapsed. Since the transmission of data packets is initiated by the synchronization pulses of the central control device, the length of the test time essentially reflects the number of synchronization pulses transmitted to a sensor unit by the central control device. In this way, the central control device can even refrain from outputting one or a plurality of synchronization pulses, thereby extending the test time without in this case losing a data packet which must be transmitted in the test operating mode. For example, this might be necessary if the central control device unexpectedly requires more time for the completion of resource-intensive computing processes.

In the preceding embodiments, details were not provided in relation to the manner in which a sensor unit is attached to the central control device in a method according to the invention. Without representing a restriction, this is normally a connecting electrical data line between the sensor unit and the central control device as at the beginning. Both the voltage supply of a connected sensor unit and the data transmission from a sensor unit to the central control device, e.g. by means of modulated current pulses, preferably take place on a single data line in this case. Furthermore, the synchronization pulse of the central control device is also output on this data line, preferably as a voltage pulse by modulating the supply voltage. However, the data communication can equally well take place via an optical fiber. In this case, a short light flash from the central control device could be used as a synchronization pulse. The necessary voltage supply could continue to take place via a conventional electrical lead in this case, but also via an optical data line with the aid of an intermediately connected voltage transformer. It is also conceivable for data communication, voltage supply and output of synchronization pulses to take place using contactless transmission techniques, e.g. electromagnetic radiation.

Moreover, the connection of only one sensor unit has been mentioned thus far. Of course, it is also possible to connect a plurality of sensor units to a data line, wherein said sensor units may well include different sensors and different electronics. The preceding explanations and all subsequent descriptions can apply equally to all connected sensor units.

As a result of electromagnetic interference fields e.g. in the vicinity of radio stations along a road or also as a result of switching operations of electronic units which are situated adjacently in the motor vehicle, induced voltage pulses can occur e.g. on the data line between the central control device and a sensor unit. In order to prevent these interferences from being falsely interpreted as a synchronization pulse by a sensor unit, it is advantageous that a sensor unit is not allowed to observe a new synchronization pulse until after the expiry of an off-period. Such an off-period advantageously begins with the time point of the detection of the last synchronization pulse which was to be observed and ends immediately before the time point of the next synchronization pulse.

A first sensor unit usually sends its data to the central control device after either a first delay or after a second delay or any further delay after the synchronization pulse. Since the central control device always knows exactly at what time point to expect data packets, it can be occupied with other tasks during the remaining time, and therefore e.g. the computing time of a microcontroller in the central control device can be better utilized.

In terms of a greater transmission security, a sensor unit can transmit a data packet containing the same sensor measured values, both after the first and after the second or a further delay. If an error occurs in only one data packet, e.g. an incorrect parity, an incorrect data packet which is detected by the central control device can be replaced by the value of an error-free received data packet.

In order to achieve a faster response speed of the passenger protection system, a sensor unit can however also transmit updated data packets both after the first and after the second or a further delay following a synchronization pulse. These updated data packets preferably contain chronologically sequential sensor measured values. It is possible thereby to achieve a transmission speed of e.g. 4 kHz, 6 kHz or more for updated data packets, even though the frequency of the synchronization pulses is only 2 kHz.

Moreover, assuming that two or more decentralized sensor units are connected to e.g. a data line of a central control device, it is particularly advantageous if the first sensor unit sends its data to the central unit after a first delay following the synchronization pulse, a second sends its data packets after a second delay, and a corresponding further sensor unit sends its data packets after a further delay following the synchronization pulse. In this way, the utilized data line becomes a bus line for two or more sensor units, without these having to be individually addressed and prompted in a resource-intensive manner by the central control device to submit sensor measured values.

It is also advantageous if sensor measured values which are determined at each connected sensor unit are available to the central control device as promptly as possible and ideally simultaneously, even if the associated data packets are sent at different time points from the connected sensor units. In this way, for example, a sensor measured value of a first sensor unit can act as a so-called safing sensor for a second sensor unit which is preferably connected to the same data line, wherein a passenger protection means is only triggered if both the first sensor unit and the second sensor unit send a sufficiently high sensor signal in each case to the central control device. The simultaneous recording of sensor measured values can be achieved, for example, in that the measured value recording by the sensors within the sensor units takes place when a synchronization pulse is detected or simultaneously thereafter, and the simultaneously recorded sensor values are buffered until they are forwarded to the control device after the first or second delay. Depending on sensor type and depending on internal clocking of the sensor units, total simultaneity of the sensor measured values is not generally reduced to practice in this case. In this respect, the term simultaneous in the context of a recording of simultaneous sensor measured values must be understood to allow that the sampling of the sensor measured values might well vary by a few internal sampling cycles. The nearly simultaneous digitization of analog sensor measured values, for example, can be considered as simultaneous recording of sensor measured values in the sensor units.

An advantageous type of encoding for a data packet is described.

A sensor unit which is suitable for carrying out the claimed method, a control device which is likewise suitable for said purpose, and an arrangement consisting of such a sensor unit, such a central control device and preferably a data line which connects these two devices together are described as well.

BRIEF DESCRIPTION OF THE DRAWINGS

The features which are specified in the various claims represent advantageous developments of the method according to the invention, both cumulatively and as individual features in varied combination.

The invention is explained below with reference to exemplary embodiments in which.

DESCRIPTION OF THE PREFERRED EMBODIMENTS

Figure 1:
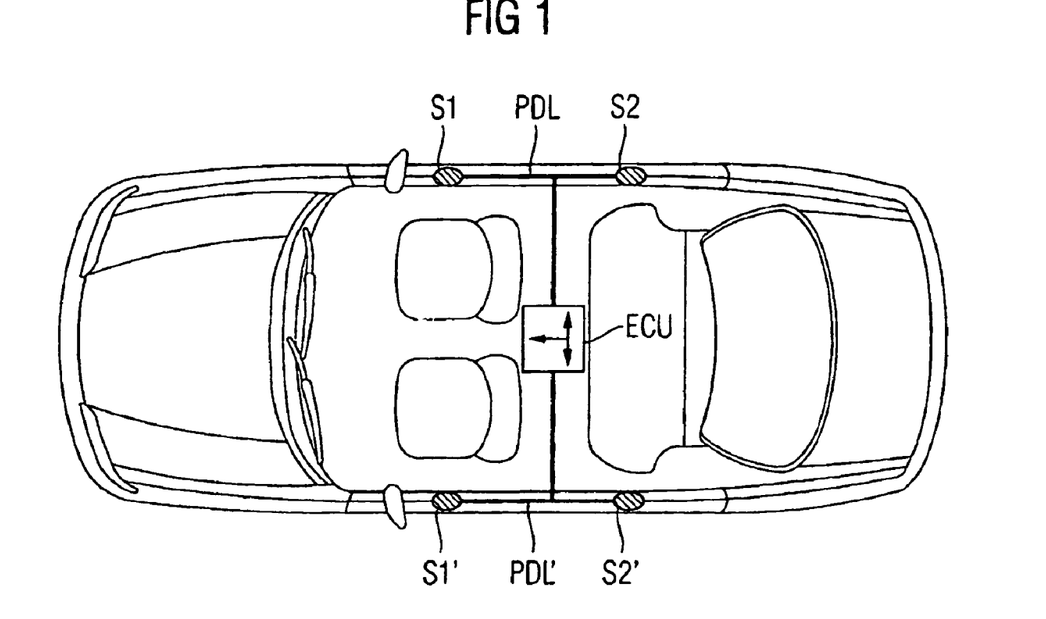
FIG. 1 shows a vehicle (1) having two data lines (PDL, PDL') which in each case connect a central control device (ECU) according to the invention to two sensor units (S1, S2, S1', S2') according to the invention.

FIG. 1 shows a vehicle 1 including an arrangement S1, PDL, S2, S1', PDL', S2', ECU according to the invention, for transmitting data on a data line PDL between a central control device ECU and two sensor units S1 and S2 which are connected to the shared data line PDL. Also shown in FIG. 1 are a further data line PDL' and further sensor units S1' and S2' which are connected to the central control device ECU via the data line PDL'.

Figure 2:
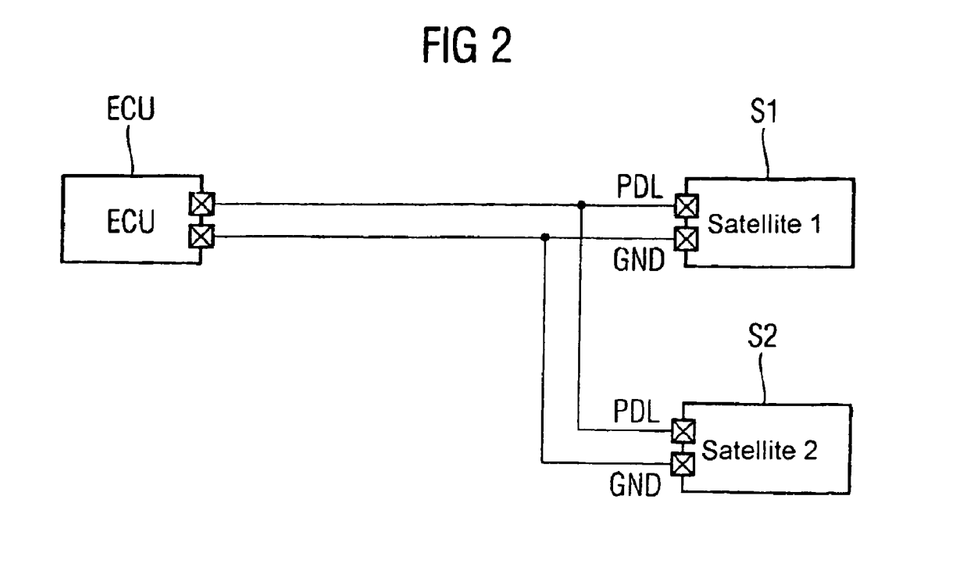
FIG. 2 shows an arrangement consisting of a central control device (ECU) which is connected to two sensor units (S1, S2) via both a ground cable (GND) and a data line/supply line (PDL)

FIG. 2 also shows a central control device ECU which is connected to a first and a second sensor unit S1 and S2 via a shared data line PDL.

The shared data line PDL is used firstly for sending voltage pulses (Sync) to the sensor units S1 and S2 periodically, e.g. every 500 milliseconds, whereby the central control device ECU requests data packets DP from the sensor units S1 and S2. Secondly, both the first sensor unit S1 and the second sensor unit S2 send data packets DP in the form of current pulses on this shared data line PDL, said data packets containing characteristic data and test data of the sensor units S1 and S2 in a test operating mode of the sensor unit, or sensor measured values of the two sensor units S1 and S2 during the normal operating mode which is predominantly present.

Also shown is a shared ground cable GND which carries the ground potential of the central control device ECU to all connected satellite units S1, S2.

Figure 3:
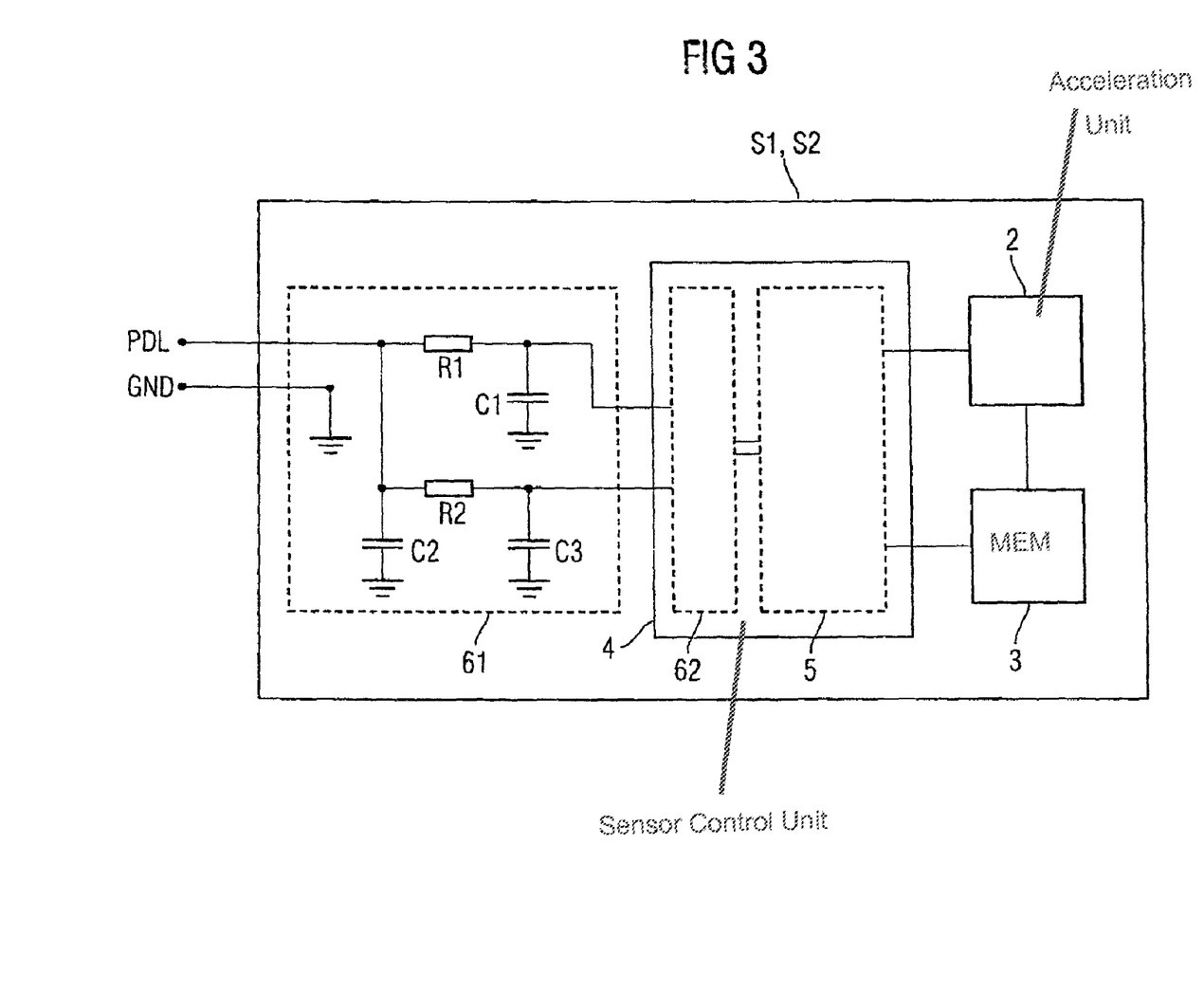
FIG. 3 shows the internal structure of a sensor unit (S1, S2) according to the invention.

FIG. 3 shows a sensor device S1 or S2 according to the invention. The features of the sensor unit S1 or S2 are described below with reference to a first sensor unit S1. However, these features naturally apply equally to a second sensor unit S2 according to the invention.

The sensor unit S1 has a sensor 2, for example an acceleration sensor 2, consisting of a semiconductor chip which includes a micromechanical semiconductor sensor element and signal processing semiconductor electronic components which are arranged in an integrated manner on the same semiconductor chip. A suitable micromechanical sensor element comprises, for example, ground structures which can move in one or more sensing directions and are interconnected with static chip parts as capacitance, said ground structures being exposed by etching processes in the manufacturing process of the semiconductor chip. Depending on the direction and the strength of an acceleration effect, the ground structures move in different ways which can be measured electrically as a capacitance change. However, another suitable sensor element comprises a pressure sensor element, in which a cavity that has been exposed by etching in the semiconductor chip is sealed against the environmental atmospheric pressure by a pressure-tight membrane of remaining semiconductor material. The semiconductor membrane is flexible relative to effects of the external air pressure and can be interconnected with inflexible chip parts as capacitance in the same way as acceleration measuring cells, such that a changing external air pressure can be measured as a changing capacitance of the semiconductor membrane in comparison with the rest of the sensor chip. Of course, it is also possible to use other sensing principles and sensor structures including, for example, mechanical acceleration switches, piezoresistive pressure or acceleration sensors, rotational speed sensors, short-circuit switches or even temperature sensors which can detect e.g. a temperature increase in a cavity which is compressed during an accident phenomenon, e.g. the internal volume of a vehicle door. Other known possibilities include, for example, thermal acceleration sensors of the MEMSIC company, in which accelerations are detected by means of heated air within the sensor being moved closer to or further from temperature sensors by the action of accelerations.

FIG. 3 also shows a memory 3 in which is stored sensor characteristic data, e.g. an identification number of the sensor unit S1, its revision level or even calibration data such as e.g. conversion formulae for the measuring range or similar.

FIG. 3 also shows a sensor control unit 4 which has both a sensor computing unit 5 and a sensor interface 61, 62.

The sensor computing unit 5 can be an application-specific integrated circuit or so-called ASIC 5 in this case, but can also be a microcontroller 5 which is controlled by software. With reference to the sensor interface 61, 62 which is illustrated in FIG. 3, a first part 61 of the sensor interface 61, 62 is constructed in the form of a discrete electronic circuit comprising resistors R1, R2 and capacitors C1, C2, C3, whereas a second part 62 is integrated with the sensor computing unit 5 within an integrated module of the sensor control unit 4. However, the whole sensor interface 61, 62 could equally well be connected discretely on a board or conversely integrated with the sensor control unit 4 entirely within a module. This also applies to the sensor 2 which, in a manner different to that in the drawing, can equally well be arranged within the sensor control unit 4 on a shared chip, possibly even with all the other functional units of the sensor unit S1.

A supply voltage is present on the data line PDL, said supply voltage being output by the central control device ECU. The central control device ECU also outputs synchronization pulses Sync periodically on the data line PDL by means of voltage modulations, in order to request data packets DP from the sensor unit S1. These are detected by the sensor interface 61, 62.

The sensor unit S1 likewise transfers data packets DP on the data line PDL, though these take the form of current pulses and not voltage pulses. For this, the sensor computing unit 5 records sensor measured values of the sensor 2, e.g. analog acceleration measured values, converts the analog sensor signal into a digital signal, and encodes the digital sensor measured value into a resolution which is predetermined for it by both the structure of the sensor and by measuring range settings which are normally stored in the memory 2. In addition, the computing unit 5 then adds a parity bit PB to the data bits DB which were generated thus, such that it is possible for a receiving unit to detect at least simple bit errors during the data transmission. The exact type and manner of the data encoding is described in greater detail below.

The previously described operating mode of the sensor unit S1 is designated the normal operating mode NM, since essentially data of the sensor 2 is forwarded to the central control device ECU in this operating mode under normal circumstances, said data being subjected to further processing there and possibly contributing to the triggering of a passenger protection means.

A further operating mode is the so-called test operating mode TM. In this mode, test data is firstly generated in the sensor unit S1, for example by deflecting the micromechanical structures of the sensor 2 by means of an electrical field and subsequently measuring the thus generated output signals of the sensor 2, or by selectively inputting known signals at test points within the electrical circuit of the sensor unit S1 and thereby provoking an expected signal. Standard characteristic data of the sensor unit S1 or similar is also transmitted to the central control device ECU in the test operating mode.

Figure 4:
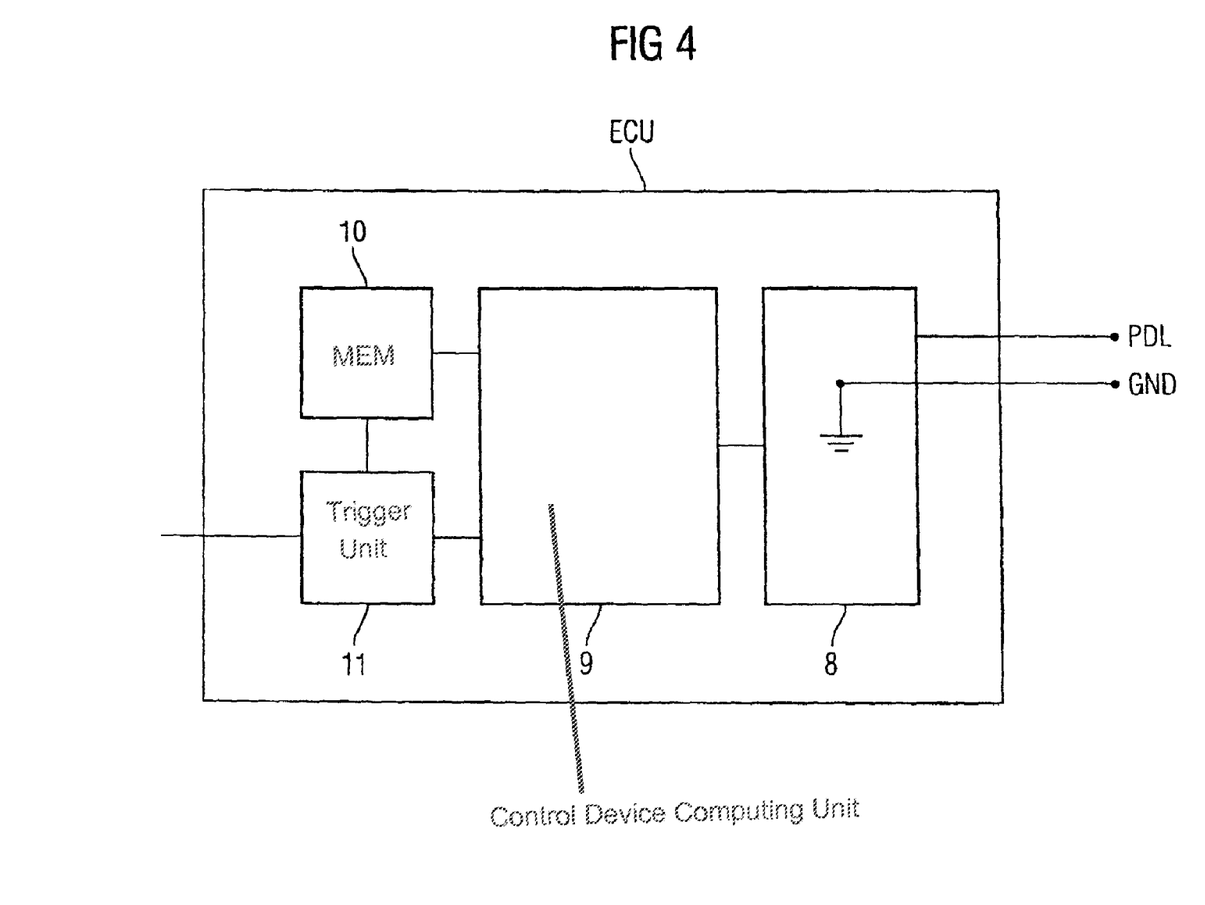
FIG. 4 shows the internal structure of a central control device (ECU) according to the invention.

FIG. 4 shows a central control device ECU according to the invention, which receives data packets DP on the data line PDL and electrically converts them provided that the control device computing unit 9 which is connected to the control device interface 8 is able to apply an algorithm to the received data packets DP, said algorithm being stored in a memory 10 of the central control device ECU and in the control device computing unit 9, in order subsequently to decide whether a corresponding control signal must be output at a triggering unit 11, thereby outputting the trigger for a passenger protection means which is connected to the triggering unit 11. A check of the correct identification code of a data packet takes place in the central control device ECU in the illustrated exemplary embodiment.

Figures 5, 6:
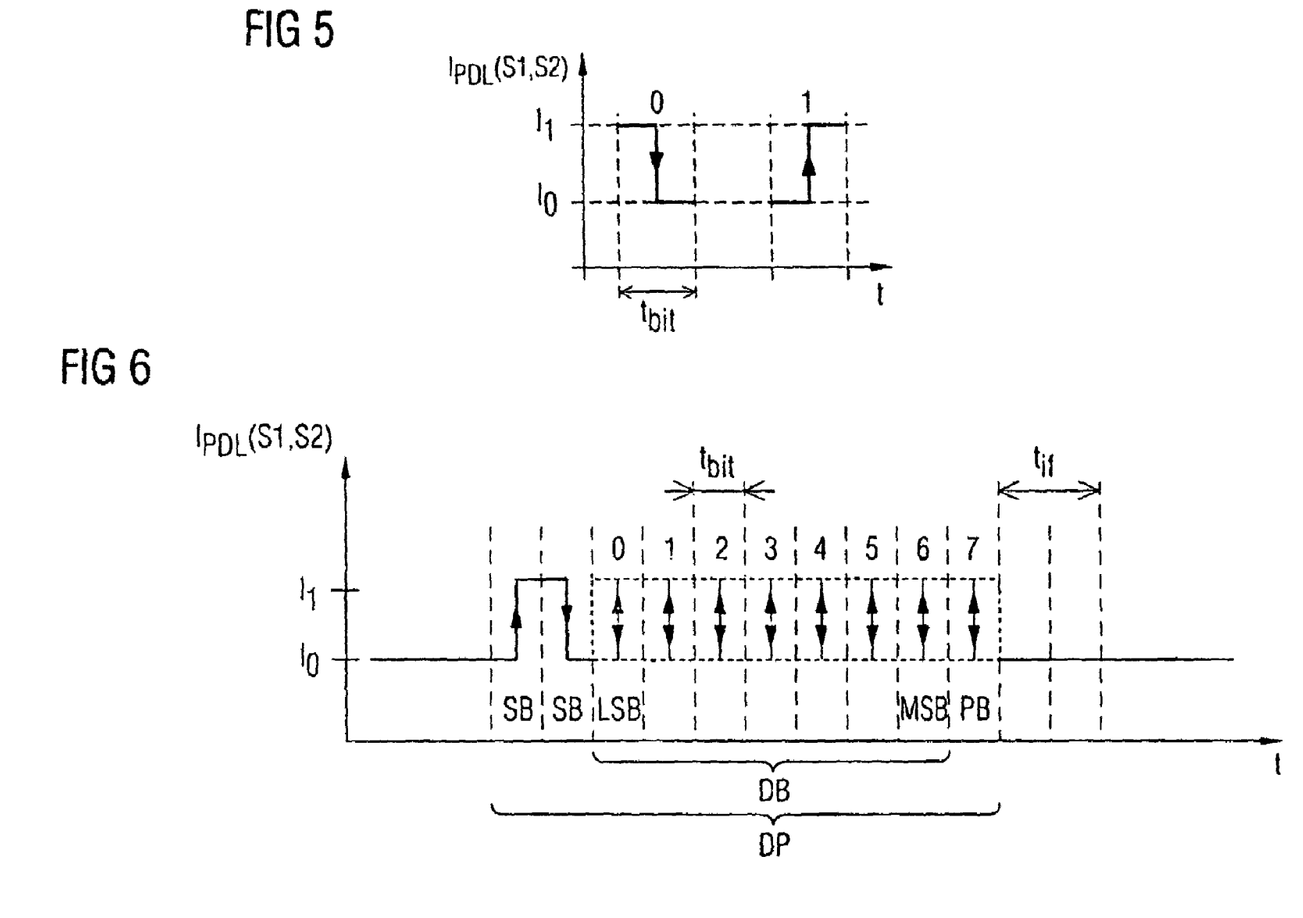
FIG. 5 shows a schematic diagram of the satellite current ($I_{PDL}$(S1, S2)) over the time (t) of a Manchester-encoded zero data bit and a Manchester-encoded one data bit.
FIG. 6 shows a schematic diagram of a current-modulated data packet according to the invention over the time (t)

The binary encoding of a data packet is described in greater detail below:

FIG. 5 shows the manner of encoding for a logical zero state and a logical one state of a data bit of a data packet DP of the sensor unit S1. The current rise $I_{PDL}$ (S1, S2) is illustrated on the vertical axis of the diagram, said current rise being caused by the data bits of a data packet DP. The manner of encoding which is used in this context for the data bits DB is an edge encoding in the one possible variant of a Manchester encoding. The Manchester encoding which is shown here represents a zero bit by means of a trailing edge in the center of a bit time $t_{Bit}$ which is reserved for one bit, and correspondingly vice versa a one bit by means of a rising edge of the current signal. In order correspondingly to represent a sequence of zero bits or a sequence of one bits, provision must be made for the data transmission to have at least a clock rate whose period duration is the time duration $t_{Bit}$ of a bit. Assuming a bit duration $t_{Bit}$ of 8 microseconds, therefore, a clock rate of at least 125 kHz is required. However, a clock rate of a multiple of 125 kHz is also possible, e.g. the clock rate of 8 MHz which is frequently used in microcontrollers.

Of course, it is also possible to use other types of edge-encoded data encoding, and even any other types of binary data encoding, e.g. the familiar NRZ (No Return to Zero) encoding.

FIG. 6 shows a complete data packet DP in a current/time diagram. The first two bits of a data packet DP are two start bits SB in accordance with a logical sequence 10. The next seven bits from bit 0 to bit 6 represent the binary encoded sensor measured values, wherein the first transmitted bit is the least significant bit LSB and the last transmitted data bit 6 is the most significant bit MSB. This data structure is to this extent identical in both the normal operating mode NM and the test operating mode TM.

In accordance with the invention, a data packet DP in the normal operating mode NM differs by virtue of the parity bit PB at the bit position 7 of the data packet DP to be transmitted. In the normal operating mode NM, the number of the seven one states of the data bits 0 to 6 is supplemented to give an odd parity P for the data packet DP. In the test operating mode TM, however, the number of the transmitted one states within a data packet DP should always be even, and therefore the parity bit PB supplements the seven data bits 0 to 6 to give a positive parity P.

Figure 7:
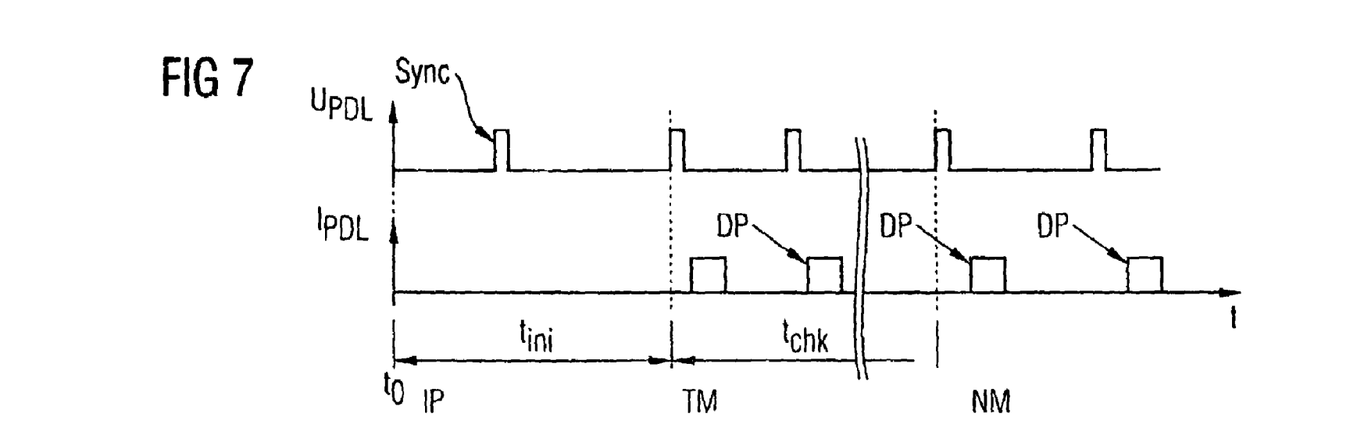
FIG. 7 shows a schematic representation of the periodic voltage rise ($U_{PDL}$) due to synchronization pulses (Sync) and the current rise ($I_{PDL}$) due to at least one sensor unit (S1, S2) over the time (t), shortly after switching on the supply voltage of the sensor units (S1, S2)

FIG. 7 shows the chronological sequence of the test operating mode TM and the normal operating mode NM of a sensor unit S1 after switching on of the supply voltage. The synchronization pulses Sync which are output periodically by the central control device ECU are shown over the time t in the upper part of the diagram, and the current rise $I_{PDL}$ which is generated by the sensor unit S1 for transmitting the data packets DP is shown over the time t in the lower part.

In an initialization phase IP which lasts for a time $t_{ini}$, the sensor unit S1 does not respond to synchronization pulses Sync. During this startup time $t_{ini}$, e.g. the voltage regulator, the capacitors C1 to C3 and all other electronic modules within the sensor control unit 4 are made ready for operation, as are the remaining functional units of the sensor unit S1, e.g. the sensor 2, the memory 3, etc.

The initialization time $t_{ini}$ is followed by the test operating mode TM of the sensor unit S1. In the test operating mode, characteristic data of the sensor unit S1 is transferred to the central control device ECU in response to the synchronization pulses Sync which request data. Each transmission of data packets DP in the test operating mode TM, and subsequently in the normal operating mode NM, is initiated by a synchronization pulse Sync.

Figure 8:
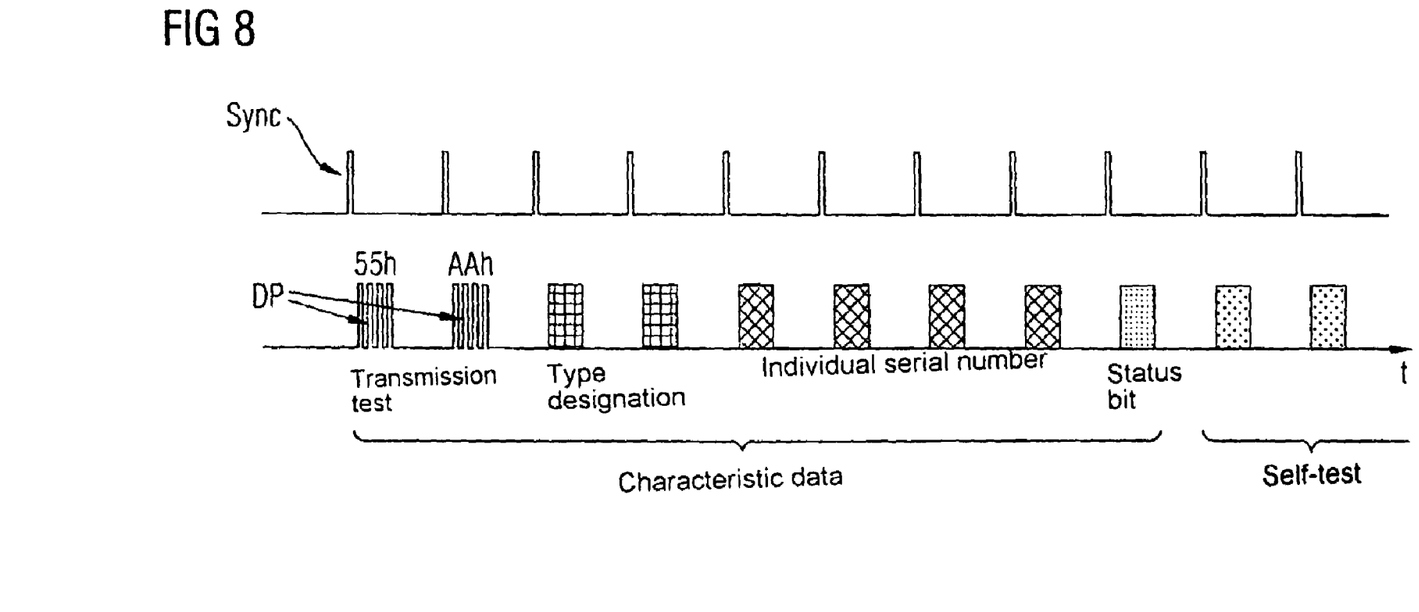
FIG. 8 shows the sequence of the characteristic-data packets which are emitted during the test operating mode (TM) of a sensor unit (S1, S2), requested by the periodic synchronization pulses (Sync) of the central control device (ECU)

FIG. 8 shows the types of characteristic data which are transmitted consecutively during the test operating mode TM.

The first two data packets DP after the first two synchronization pulses Sync are data packets DP which have contents that are already known, in order to test the data transmission itself, e.g. the hexadecimal values 55h and AAh. Two data packets DP are then transmitted whose content provides information about the type of sensor used, its sensitivity, its output range, and the series level of the electronic circuit of the sensor unit S1. The next four data packets DP contain the serial number of the sensor unit S1. Since a data packet has seven data bits, serial numbers from 0 to $268 \times 10^6$ can be represented by these four data packets DP. These are followed by a data packet DP which shows the status of the connected sensor unit S1. This can be used to indicate proper functionality of the sensor unit S1, for example, or to transfer one of a plurality of error codes. In the normal operating mode which occurs subsequently, however, as a result of the limited resolution of a data packet due to only seven data bits DB, a plurality of error codes are combined into a single error report 1111111.

There now follows a self-test of the sensor unit S1, e.g. a self-test of the sensor 2 as previously described above. The results of this self-test are transferred in the form of consecutive data packets DP, said data packets being requested by the central control device ECU by means of synchronization pulses Sync.

It can be seen from FIG. 7 that the test operating mode TM begins after expiry of the startup time $t_{ini}$ and ends after the expiry of the test time $t_{chk}$. The time $t_{chk}$ lasts until the start of a new synchronization pulse, after which all desired data packets DP are transmitted in the test operating mode TM, there being 201 data packets in the present exemplary embodiment.

The test operating mode TM is followed by the normal operating mode NM of the sensor unit S1, in which sensor measured values are transmitted to the central control device ECU in the form of data packets DP after each synchronization pulse Sync in the manner which is already known.

Figure 9:
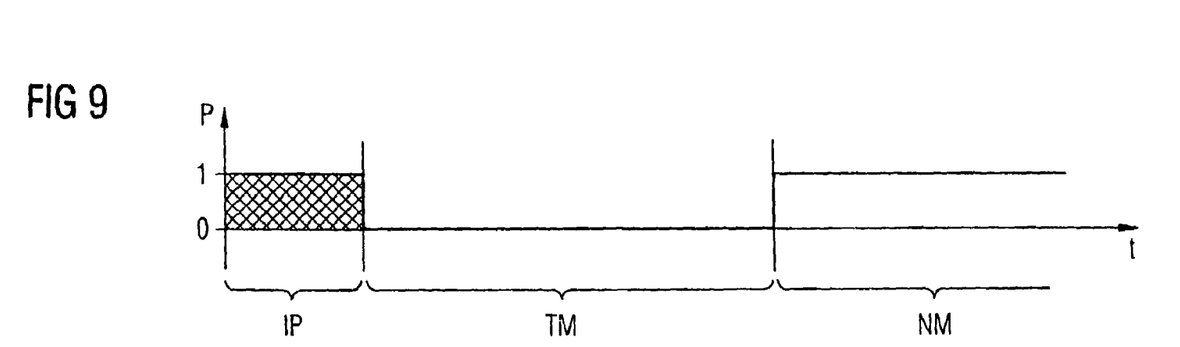
FIG. 9 shows a schematic representation of the parity (P) of the transmitted data packets (DP) of a sensor unit (S1, S2) over the time (t) during the initialization phase (IP), during the time ($t_{imi}$) of the test operating mode (TM), and during the normal operating mode (NM) of a sensor unit (S1, S2)

In a diagram, FIG. 9 shows the state of the parity P of the data packets DP which are emitted by the sensor unit S1 during the two operating modes that have been described and the initial initialization phase IP. The parity is plotted on the upwards axis and the time on the rightwards axis. The value 1 of the parity P, as shown in the diagram, represents an odd parity P in accordance with a logical one, and the value 0 expresses an even parity P in accordance with a logical zero. The parity P is unspecified in the initialization phase IP of the sensor unit S1, since no data packets DP are transmitted to the central control device ECU in that phase and therefore the data transmission security is not important. The parity P of the transmitted data packets DP is even, 0, in the test operating mode TM and changes to an odd parity P, 1, with the first transmitted data packet DP in the normal operating mode NM of the sensor unit S1.

Figure 10:
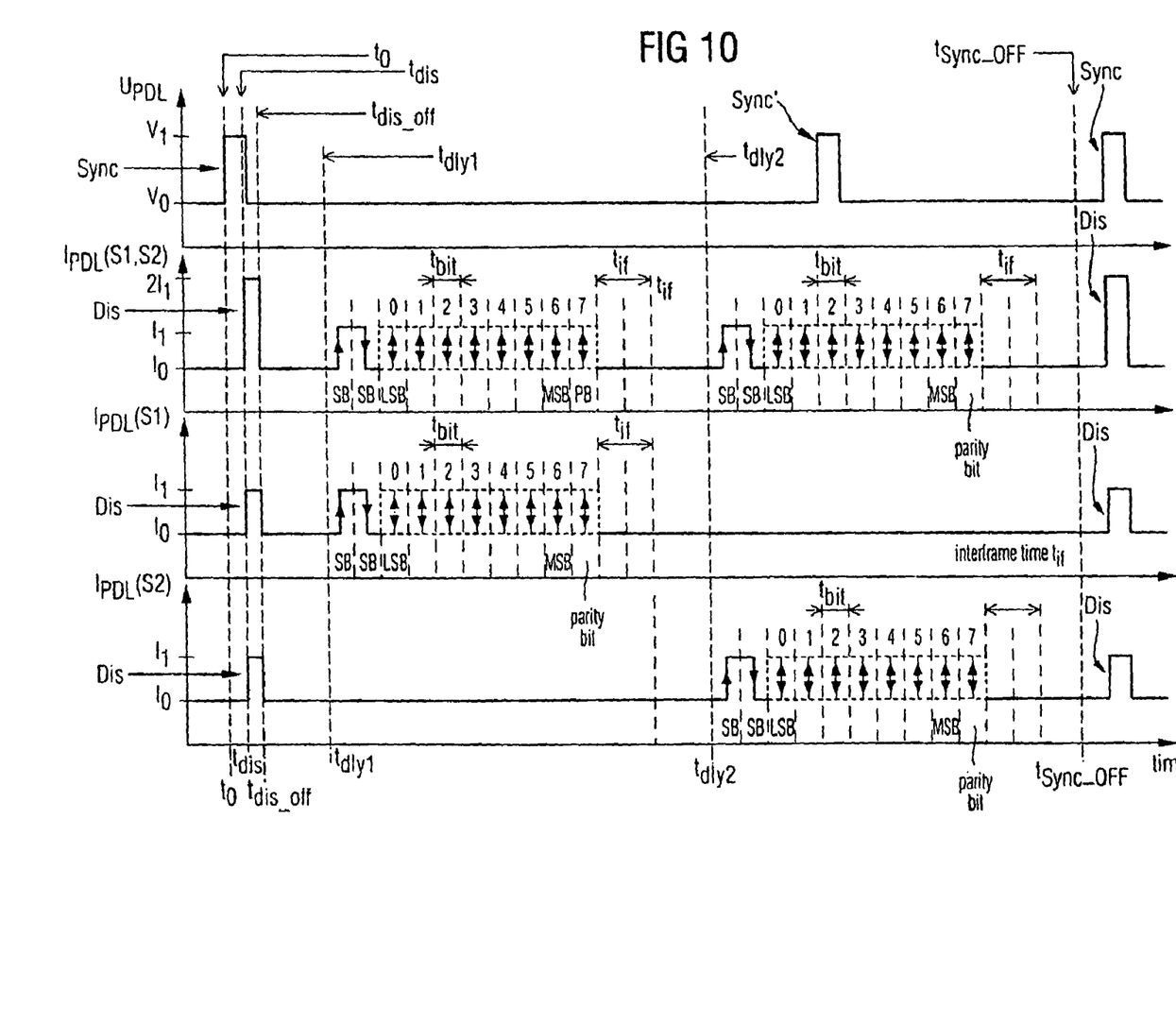
FIG. 10 shows a schematic representation of the chronological sequence of first and second data packets (DP) of a first and/or second sensor unit (S1, S2) during the normal operating mode (NM), wherein the data packets (DP) are sent either after a first delay ($t_{DLY1}$) or after a second delay ($t_{DLY2}$)

FIG. 10 shows a sequence of two periodic synchronization pulses Sync and one false synchronization pulse Sync', drawn on the same time axis in each case, in the uppermost diagram. The current $I_{PDL}$ (S1, S2) is drawn on the upwards axis in the second diagram from the top, said current being generated when two sensor units S1 and S2 are connected to a data line PDL as illustrated previously in FIG. 2. Starting with the two start bits SB in each case, the data packet DP of the first sensor unit S1 is output after a first delay $t_{dly1}$ following the synchronization pulse Sync, and the data packet DP of the second sensor unit S2 after a second delay $t_{dly2}$. The false synchronization pulse Sync' which is induced on the shared data line PDL by an electromagnetic interference, for example, does not initiate a transmission of a data packet DP from the sensor unit S1 or from the sensor unit S2, since the signal output of both is disabled until the expiry of an off-period $t_{Sync\_Off}$ following the last recognized valid synchronization pulse Sync.

In order to counteract an unwanted charging of the input network R1, C1, R2, C2, C3 of the first part 61 of the sensor interface 61, 62, said charging being caused by the synchronization pulse Sync, a short discharge pulse Dis having a doubled current amplitude of a data bit DB occurs through both sensor units S1 and S2 after a discharge off-period $t_{dis}$. The third and fourth diagrams from the top show the current signal rise $I_{PDL}$ (S1) and $I_{PDL}$ (S2) which is caused by only one sensor unit S1 or S2, wherein the data output of the first sensor unit S1 occurs after the first off-period $t_{dly1}$, whereas the data output of the second sensor unit occurs after the second off-period $t_{dly2}$. Merely one discharge pulse Dis suffices in both cases correspondingly, said discharge pulse merely having a current amplitude of a data bit DB.

Figure 11:
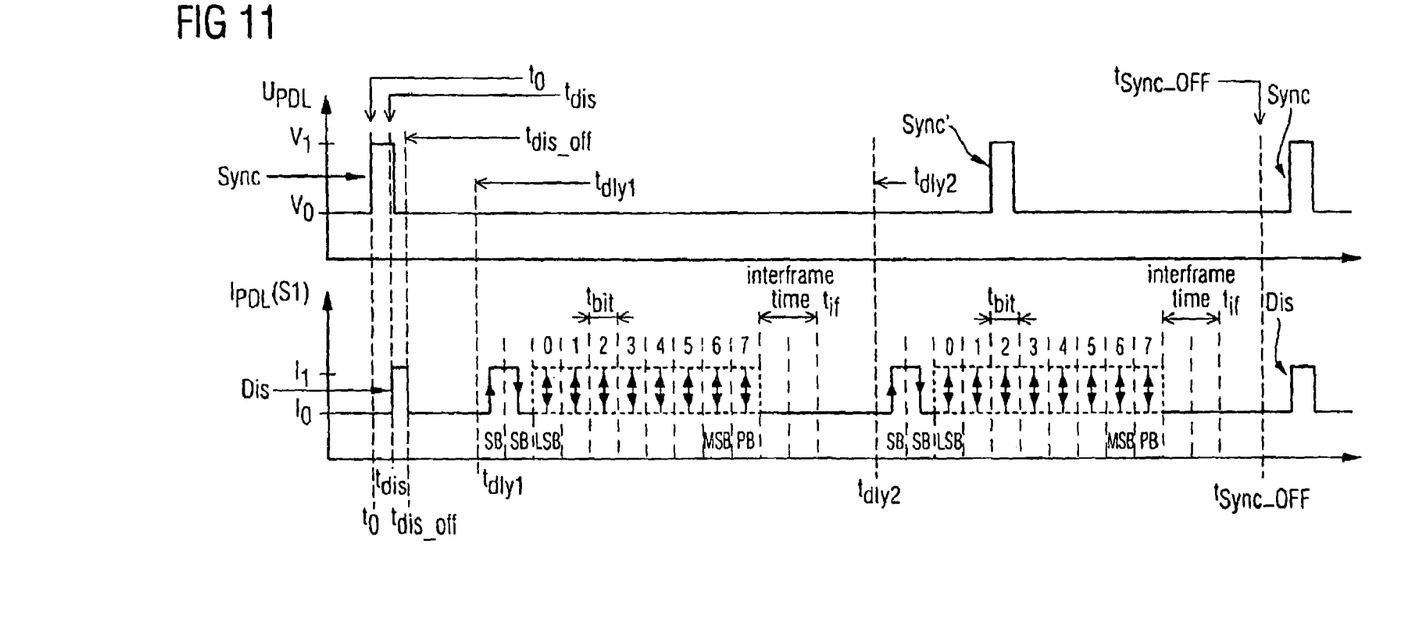
FIG. 11 shows a schematic representation of a current-modulated data communication of a sensor unit (S1), wherein data packets (DP) of the first sensor unit (S1) are sent both after the first delay ($t_{DLY1}$) and after the second delay ($t_{DLY2}$) within a period duration ($T_{Sync}$) of a synchronization pulse (Sync).

It is also possible to connect only one sensor unit S1 or S2 to the data line PDL, but to send data packets DP of this one sensor unit S1, S2 both after the first off-period $t_{DLY1}$, and after the second off-period $t_{DLY2}$. This is advantageous above all if a strong interference of the signals is expected on the data line PDL and it is nevertheless desired to detect and correct an incorrectly transmitted information by means of a redundant transmission using data packets DP having identical information content.

Alternatively however, it is also possible in each case to transmit the latest sensor values in the consecutive data packets DP, such that e.g. instead of a data transmission rate of 2 kHz which is specified by the pulse period duration of the periodical synchronization pulses (Sync) of the central control device ECU, an effective transmission rate of 4 kHz can be achieved.

I claim:

1. A method of transmitting data between a central control device of a passenger protection system in a vehicle and at least one decentralized sensor unit, the sensor unit having a sensor for recording sensor measurement data, and the sensor unit being selectively operated in a normal operating mode wherein the transferred data contain sensor measurement data or in a test operating mode wherein the transferred data contain characteristic data of the sensor unit, and the method, in the normal operating mode and in the test operating mode, comprises:
   transferring data from the sensor unit as data packets comprising individual data bits;
   periodically outputting synchronization pulses with the central control device in order to request data packets; and
   always sending, from the sensor unit, the data packets respectively awaiting transmission to the control device after a most recent synchronization pulse;
   appending, in the sensor unit, an identifier to the data bits awaiting transmission by adding at least one identifier bit before the transmission to the central control device; and
   wherein the data packets in the normal operating mode have a different identifier than the data packets in the test operating mode, and the data packets of the normal operating mode are clearly distinguishable from the data packets of the test operating mode based on the relevant identifier.

2. The method according to claim 1, which comprises:
   defining the identifier of a data packet as a parity of the data packet;
   and appending the parity to the respective data packet by adding a parity bit such that, depending on a logic state of the added parity bit, a number of logical ones among the data bits in a data packet is increased to an even number in order to form an even parity of the data packet, or to an odd number in order to form an odd parity, and the data packets in the normal operating mode have a different parity than in the test operating mode.

3. The method according to claim 2, which comprises:
   setting the data packets in the normal operating mode to an odd parity; and
   setting the data packets in the test operating mode to an even parity.

4. The method according to claim 1, wherein the identifier of a relevant data packet is formed by a characterizing checksum appended to the respective data packet by adding a plurality of checksum bits, wherein the characterizing checksum in the normal operating mode always has a different value from the characterizing checksum in the test operating mode.

5. The method according to claim 1, which comprises, following a switching on of a sensor unit supply voltage by the central control device, the sensor unit:
   does not send data packets in response to the data-requesting synchronization pulses of the central control device until after expiry of an initialization time;
   is operated in the test operating mode during a test time after expiry of the initialization time, wherein the test time lasts until a predetermined number of data packets have been transferred; and
   is not operated in the normal operating mode until after expiry of the test time.

6. The method according to claim 1, which comprises:
   feeding a voltage supply to the sensor unit and the data transmission on a single electrical data line; and
   periodically outputting with the central control device synchronization pulses by modulating the supply voltage on the single data line in order to request data packets.

7. The method according to claim 1, wherein a further output of data packets of the sensor unit cannot be initiated by a new synchronization pulse until after an off-period, which begins with a most recently detected synchronization pulse and ends immediately before the next synchronization pulse.

8. The method according to claim 1, wherein a first data packet of a decentralized sensor unit is sent to the central control device after a first delay after a synchronization pulse within a period duration of the periodically recurring synchronization pulses.

9. The method according to claim 8, which comprises sending a second data packet of the decentralized sensor unit to the central control device after a second delay following the synchronization pulse within a period duration of the periodically recurring synchronization pulses, and possibly further data packets after corresponding further delays.

10. The method according to claim 9, which comprises transmitting with the first and second data packets, and optionally with further data packets of a sensor unit, a value derived from a common sensor measured value.

11. The method according to claim 9, which comprises transmitting with the first and second data packets, and optionally with further data packets of a sensor unit, a value derived from mutually different sensor measured values.

12. The method according to claim 11, wherein the mutually different sensor measured values are from two or more chronologically sequential sensor measured values.

13. The method according to claim 11, wherein each data packet of a plurality of decentralized sensor units that are connected to the data line is not sent to the central control device until after a delay after the synchronization pulse, the delay being variable in each case.

14. The method according to claim 13, which comprises triggering the sensor units by the synchronization pulse to record their sensor values from a relevant sensor, such that the relevant sensor measured values which are transferred in the data packets of different sensor units are recorded simultaneously in each case within the bounds of the measuring tolerance.

15. The method according to claim 14, which comprises reading out the sensor values by digitizing sensor measured values received in analog form.

16. The method according to claim 1, which comprises edge-encoding the data bits of the transferred data packets.

17. The method according to claim 16, wherein the data bits are Manchester-encoded.

18. The method according to claim 1, which comprises defining a data packet in the normal operating mode and/or in the test operating mode with the following bit pattern:
   7 data bits for transferring the sensor measured values or sensor characteristic values;
   2 start bits; and
   a parity bit.

19. In a passenger protection system in a vehicle, a sensor unit for capturing sensor measured values and for transmitting the sensor measured values to a central control device in accordance with a method according to claim 1, the sensor unit comprising:
   a sensor, a memory, a sensor control unit, a sensor computing unit, and a sensor interface;
   at least one of said sensor control unit and said sensor computing unit being configured for initiating an output of a correct identifier of a data packet DP in each operating mode of the sensor unit.

20. A central control device configured for transmitting data between a central control device of a passenger protection system in a vehicle and at least one decentralized sensor unit the central control device comprising:
   a control device interface, a control device computing unit connected to said control device interface, and a control device memory connected to said control device computing unit, said control device interface being configured to:
   output a supply voltage for at least one sensor unit according to claim 19;
   periodically output synchronization pulses for requesting data packets from the sensor unit;
   receive data packets transmitted as current pulses; and
   said sensor computing unit being configured to recognize a correct identifier of a data packet.

21. A configuration for executing the method for transmitting data according to claim 1, the configuration comprising:
   a sensor unit for capturing sensor measured values and for transmitting the sensor measured values, the sensor unit having:
   a sensor, a memory, a sensor control unit, a sensor computing unit, and a sensor interface;
   at least one of said sensor control unit and said sensor computing unit being configured for initiating an output of a correct identifier of a data packet DP in each operating mode of the sensor unit;
   a central control device configured for transmitting data between a central control device of a passenger protection system in a vehicle and said sensor unit, said central control device having:
   a control device interface, a control device computing unit connected to said control device interface, and a control device memory connected to said control device computing unit, said control device interface being configured to:
   output a supply voltage for said sensor unit;
   periodically output synchronization pulses for requesting data packets from said sensor unit;
   receive data packets transmitted as current pulses; and
   said sensor computing unit being configured to recognize a correct identifier of a data packet.

* * * * *